United States Patent
Powell

(10) Patent No.: US 6,241,887 B1
(45) Date of Patent: Jun. 5, 2001

(54) METHOD FOR UTILIZING TYRES TO CLEAN AND/OR FERTILIZE WATER

(76) Inventor: James Anthony Powell, 91 Bridge Street, Morley, Leeds LS27 Oey (GB)

(*) Notice: Subject to any disclaimer, the term of this patent is extended or adjusted under 35 U.S.C. 154(b) by 0 days.

(21) Appl. No.: 09/467,519

(22) Filed: Dec. 21, 1999

Related U.S. Application Data

(63) Continuation of application No. 08/875,647, filed on Jul. 31, 1997, now abandoned.

(30) Foreign Application Priority Data

Feb. 1, 1995 (GB) .................................................. 9501952
Feb. 1, 1996 (WO) .................................. PCT/GB96/00232

(51) Int. Cl.$^7$ ....................................................... C02F 3/32
(52) U.S. Cl. .......................... 210/602; 119/222; 210/747; 210/749; 210/758; 405/21; 405/25
(58) Field of Search ..................... 205/758; 210/691–693, 210/747, 757, 758, 924, 749, 602; 119/221, 222; 405/36, 43, 45, 46, 1, 31, 21, 25, 28; 71/1, 31

(56) References Cited

U.S. PATENT DOCUMENTS

| | | | |
|---|---|---|---|
| 3,739,913 | * 6/1973 | Bogosian | 210/484 |
| 3,928,701 | * 12/1975 | Roehner | 428/222 |
| 4,196,694 | * 4/1980 | Buchanan | 119/3 |
| 4,205,625 | * 6/1980 | Muller-Feuga | 119/3 |
| 4,334,499 | * 6/1982 | Baass | 119/3 |
| 4,824,287 | * 4/1989 | Tracy | 405/36 |
| 5,213,058 | * 5/1993 | Parker et al. | 119/2 |
| 5,238,325 | * 8/1993 | Krenzler | 405/21 |
| 5,807,023 | * 9/1998 | Krenzler | 405/21 |
| 5,823,711 | * 10/1998 | Herd et al. | 405/36 |

\* cited by examiner

*Primary Examiner*—Peter A. Hruskoci
(74) *Attorney, Agent, or Firm*—Woodard, Emhardt, Naughton, Moriarty & McNett

(57) ABSTRACT

The invention of this application relates to a method for utilizing tires for vehicles whereby the tires are introduced into a water such as rivers, seas, oceans or lakes, and thereby is used to improve the environment of the water and also the general environment. The method includes the step of cutting into and/or removing a portion of the rubber element of the type to expose the metal therein to the water when the tire is submerged in the same. The exposure of the metal to the water allows the same to corrode and allows the introduction of elements of the metal into the water. This creates increased oxygenation of the water which, in turn, improves the quality, and, by photosynthesis, reduces the carbon dioxide content in the water and hence reduces the level of pollution in the same. Preferably a number of tires are linked together to form barriers and/or reefs within the body of water and said barriers and reefs also act as a suitable habitat for marine and river life. The invention therefore provides a suitable utilization for the vast quantity of vehicle tires which are stored throughout the World at the present time.

15 Claims, No Drawings

METHOD FOR UTILIZING TYRES TO CLEAN AND/OR FERTILIZE WATER

This application claims priority to United Kingdom Application No. 9501952.7, filed Feb. 1, 1995 and PCT/GB96/00232, filed Feb. 1, 1996, and is a continuation of U.S. Ser. No. 08/875,647, filed Jul. 31, 1997, now abandoned.

This invention relates to an Aqua Culture component, and is particularly concerned with the cleansing and fertilising of water, and the protection of aquatic plant and animal life.

This invention aims to provide a use for the very large quantities of scrap tires, which have proved and which are proving to be a constant source of concern, particularly in these days of environental awareness.

According to the invention there is provided a water component comprising a scrap tire housing a quantity of gravel or stone, preferably a solid form of ballast such as hard core mixed with cement will be used. Ballast may be in briquette form, or ballast may be put in a tin can container, and then housed inside the tire. It may be preferred to mix a water fertilising compound with the ballast, all these options are open.

Scrap tires of all sizes are to be used, be it car, commercial or agriculture tires. It is also proposed to provide a water component comprising of a scrap tire having a portion or portions of surface rubber removed, so as to expose the iron/steel wire content of the said tire component. This process is optional, although it is preferred to expose the steel wire of the tire which is essential to the invention.

The tire rubber surface may be removed from any part of the scrap vehicle tire so as to expose steel. The rubber will be removed by buffing or grinding process or, alternatively, the steel can be exposed by cutting into the steel wire or by any other conventionally known means. These processes will not alter the overall structure of the components, it is the gentle rusting of the steel that will neutralise acid rain, and also oxygenate water.

These Aqua-Culture components as will be appreciated, consist mainly of rubber and steel/iron, as rubber is a natural polymer the components are polymetalic. These tire components contain some very important cleansing and oxygenating elements, therefore the application of these components submerged in water will neutralise acid rain which is of vital importance for the protection of all aquatic plant and animal life. Trace amounts of certain metals are essential to plant and animal life, iron for the animal's blood cells is particularly important.

It is intended for these aquatic fertilising components to be located in all water-ways and estuaries and dropped off-shore in coastal waters. When dropped in water these components will sink to the bottom and remain anchored because of the content of ballast.

These components derived from scrap tires possess some very valuable light harvesting elements and pigments that allow the light to be transmitted through the water more easily, and to greater depths, which in turn provides a healthy aquatic environment for the proliferation of marine plant life, algae (phytoplankton). The proliferation of life is due to a process known as photosynthesis, which is important for all life on earth. Only green plants can convert sunlight into chemical energy.

Aquatic components include an abundance of life supporting elements, pigments and minerals, such as Carbon, Steel, Sulphur, Selenium, Telurium, Amyl Alcohol, Zinc Oxide, Ester, Ether, Ethylene, Urea Formaldehyde, Oil (age resisters as antioxidants) and many more.

The properties of rubber and steel for the treatment of water as described in this invention do seem an ideal combination.

When these components are dropped off-shore in coastal waters, they will form very beneficial artificial reefs. Rubber is an organic compound, and does possess and perform many life-like activities.

Whilst reference has been made to the use of a single tire, a plurality of aqua components may be secured together or anchored in close proximity to each other so as to provide an enlarged area. Reefs will be a haven for marine life and growth of seaweed and coral will form on the reefs. Linkage of tires together may be by any known conventional means, e.g. rope, chain or wire—linkage is optional.

Aqua Components contain compounds of biological importance. The surface rubber forms an excellent substrate on which an organism lives and from which it may derive its food. It is a fact that these Aqua Components do attract and cause the proliferation of fresh water shrimps and other marine life.

There is a shortage of iron in the oceans which restricts the growth of algae (phytoplankton). Many oceans and lakes throughout the world are in a barren and lifeless state. By way of this invention applied as described earlier and by making available the steel/iron content of all the millions of tons of scrap tires this barren situation can be rectified. This steel content of all scrap tires is very valuable due to the fact that it neutralises acid rain.

The steel wire content of all tires is as yet unavailable, because it is insulated by rubber, the steel is of a highest quality, when these Aqua Components are submerged in water. The steel wire will gently rust, and the fertilising will begin. The rusting process is caused by electrolyses.

Iron rust consists essentially of hydrated ferric oxide which usually contains some ferrous oxide and iron carbonates. The presence of carbon dioxide ($CO_2$) yielding carbonic acid, iron carbonate forms the mineral siderite. Carbon dioxide is produced by the action of acid on carbonates—it becomes the common Soda Water and the carbonated water of natural springs combined with lime it constitutes limestone, common marble and chalk. Sodium carbonate is a good neutraliser of acid rain.

In a first aspect of the invention there is provided a method of utilising a vehicle tire to cleanse and/or fertilise water comprising the steps of removing a portion of rubber of said tire to expose the metal therein and introducing said tire into the water such that said metal is exposed to the water.

In one embodiment the metal is exposed by drilling and/or cutting a plurality of apertures into the rubber tire to remove rubber and expose the metal to water through said apertures. Typically the drill hole passes onto or through the metal layer and preferably the structure of tire is not altered thereby maintaining the strength of tires. Typically the metal provided in the tires is of a wire or solid wall form.

In a further feature of the invention the method includes the step of attaching material to the tire to form ballast and placing the same in said water to maintain the tire in a substantially submerged state.

In one form the ballast material is a quantity of gravel or stone and typically can be mixed with cement to form a solid material.

Alternatively the ballast is provided in a briquette form. In whichever form the ballast can include a water fertilising compound.

Preferably a plurality of tires are linked together before placing into the water so that in situation in the water they form a barrier or reef or structure such as a fish farm, therein.

The tires are placed into the water for the purpose of generating oxygenation of said water by the exposure of the metal of the tires to the water.

The invention therefore provides a suitable utilisation for the vast quantity of vehicle tires which are stored throughout the World at the present time and, at the same time, provides distinct advantages to the environment of the rivers and oceans. Considerable savings can then also be obtained in conjunction with considerable improvements to the environment.

Plants make use of $CO_2$ in the process of photosynthesis, retaining the carbon for the construction of food material and giving out the oxygen—hence oxygenating aquatic environments.

The Aqua Culture Components, when located in lakes, rivers, canals and oceans, will harness solar energy for the benefit of all marine plant and animal life, thereby increasing photosynthesis, which is the vital plant life process. We can reduce $CO_2$ carbon dioxide in the atmosphere, neutralise acid rain and reduce global warming.

By fertilising the oceans, rivers, lakes, estuaries and canals with the Aqua Culture Components, algae will grow and proliferate, soak up excess carbon dioxide $CO_2$ from the atmosphere by a process known as photosynthesis, neutralise acid rain and reduce global warming. This invention does unlock a very valuable resource, i.e. steel, that will benefit mankind by way of fertilising waterways. These components can also be used in fish farming.

The proposals in accordance with the invention provide an ideal environment for all aquatic life. There are many scientific factors unclear and not fully understood at this present time. It is clear, though, from experiments conducted, that the Aqua Components will fertilise and purify water by neutralising acidity.

These tire components do interact beneficially with the environment. They do possess a unique form of environmental artificial intelligence.

Some authorities believe that new technology will enable existing resources currently of little importance to replace those being exhausted. This invention will contribute to this.

It is a fact that more iron added to water means more photosynthesis and more photosynthesis means less carbon dioxide in the atmosphere.

I believe the compound of this water cleansing component also has the potential to produce an enzyme or maybe a group of enzymes that have the ability to attack and break up the molecules of many toxic and carcinogenic substances, hence it cleanses contaminated water and does seem to convert light energy into chemical energy ((photosynthesis).

It is to be appreciated that among the many special elements mixed with rubber and iron, it would appear that the most essential element is carbon, in both rubber and iron. Carbon is an excellent absorbent material, hence the purifying of water.

Rubber is a very unique compound as it is immune to all known plant and animal diseases. Its lifespan is infinite, it does not decay, it does not lose elasticity that is noticeable and it reacts and interacts physically and chemically with the equatic environment beneficially.

The Aqua Component converts energy from light, or raw chemical from the nutrients to be taken up as food by all plant and animal life. These components may be regarded as supreme catalysts. I also believe that these components derived from scrap tires possess photosynthetic pigments/elements.

These components react instantaneously to all movement and vibration in the aquatic environment, and produce chemical, electrical and physical responses, adding iron to the oceans and other waterways and also stimulates plankton growth and increases chlorophyll levels.

These components are capable of, or assisting in Chemosynthis. Chemosynthetic bacteria can survive without light energy and they can live in inhospitable regions, including the hydrothermal vents of the Pacific ocean. The chemosynthetic bacteria are the basis of a food web supporting fishes and other marine life.

The Aqua Components are capable of oxygenating water and the sulphur/carbon content of the compound may be very good for the treatment of sewage. There is a bacteria known as thiobacillus that derives energy from the oxidation of sulphides, thiosulphides and sulphur, and obtains carbon from $CO_2$, bicarbonates and carbonates in solution.

The Aqua Components are also capable of ion exchange, a process whereby ions may be reversibly interchanged at the boundary of a liquid and a solid in contact. The composition of a solid not being altered, used especially in water softening and the purification of solutions.

It may be possible that by increasing microscopic marine creatures we could alter the composition of the earth's atmosphere; although these organisms are tiny they are very abundant. More than a fifth of the world's oceans have surface waters with plenty of nutrients, but only small amounts of iron.

Iron as a catalyst in chlorophyll formation, nitrogen, sulphur and phosphorous are required for protein synthesis, while magnesium is a constituent of the chlorophyll molecule. Iron acts as a catalyst in the building up of the complex molecules of chlorophyll. Without chlorophyll the plant world could not exist. It is true that certain bacteria can obtain these foods by breaking down iron and sulphur compounds, and so are independent of light and of the products of other forms of life.

This application applied in aquatic environments is of vital importance. These components will maintain water in a healthy condition. Waters that are polluted will gradually be conditioned. The proliferation of marine life will in turn maintain the earth's atmosphere by way of photosynthesis, soaking up excess $CO_2$, which is the cause of the greenhouse effect. New environmental technology is of the utmost importance if a global disaster is to be avoided at some time in the future. It is only a matter of time at the rate we are progressing pollution before an irreversible global catastrophe occurs.

The invention is aimed at protecting the environment. Aqua Culture Components are formed from a waste product, which is available in abundance. A scrap tire is derived from a non-renewable source. There is estimated to be some fifty billion dollars worth replaced annually world-wide.

It is my intention with this invention to hopefully counterbalance the vast destruction of the world environment, and the waste of valuable non-renewable resources. It is albeit a quantum challenge and it will take a colossal world-wide commitment to reverse the situation.

This I believe will be achieved by using these Aqua Components formed from scrap tires. The reason I consider scrap tires to be a valuable waste resource is the fact that we use 10% of tire and waste 90%. Because of facts and proposals stated in this description, it is not unreasonable to imagine that the end value of a tire could be worth more than its original value, if the introduction of these components are proved to be successful over an indefinite period of time.

Hopefully, these components will reduce famine in third world countries and throughout the world. These components will neutralise acid rain and reduce global warming. It is possible, I believe, to convert the waste into a gain whereby it will never be a waste again.

One further very important factor is the colour of the component being totally black. It is termed a black body—this refers to an object that absorbs all electromagnetic radiation that falls upon it and does not radiate any. No perfect black body really exists? A surface covered with pure carbon will absorb about 97% of all light striking it. These components do contain a high content of pure carbon, and may be approaching that of a perfect black body.

Carbon is the only element that will form giant molecules made up of rings and chains of atoms to which atoms of other elements, chiefly hydrogen, oxygen and, nitrogen, may be attached. It is upon such complex giant molecules, particularly the protein and nucleic acids that the phenomena of life are built, carbon is the key to all living tissues.

The most important catalyst on this planet is chlorophyll, which in some way is able to trap the energy of light and use it to build up sugars with effortless ease from water and $CO_2$. This complex compound does seem to possess the same potential. There must come a time when a scrap tire will have a worthwhile use, if by neutralising acid rain and cleaning up the oceans and estuaries we can reduce global warming then scrap tires will become true wheels of fortune.

This invention converts a potential environmental waste pollutant into an enviro-friendly agent by neutralising pollutants (acid rain).

What is claimed is:

1. A method of stimulating plankton growth, said method comprising the steps of: selecting a tire having metal including iron enclosed within a rubber exterior; removing a portion of rubber of said tire to expose the metal therein; and introducing said tire into water containing plankton such that said metal is exposed to the water to in an amount effective to stimulate plankton growth.

2. A method according to claim 1 wherein the metal is exposed by drilling and/or cutting a plurality of apertures into the rubber tire to remove rubber and expose the metal to water through said apertures.

3. A method according to claim 2 wherein the metal in the tire is arranged in a metal layer and said removing comprises drilling a drill hole that passes through the metal layer.

4. A method according to claim 1 wherein the metal provided in the tire is of a wire form.

5. A method according to claim 1 including the additional step of attaching material to the tire to form ballast and placing the same in said water to maintain the tire in a substantially submerged state.

6. A method according to claim 5 wherein the ballast material is a quantity of gravel or stone.

7. A method according to claim 6 wherein the ballast is in a solid form such as hardcore gravel or stone mixed with cement.

8. A method according to claim 5 wherein the ballast is provided in a briquette form.

9. A method according to claim 5 wherein the ballast includes a water fertilising compound.

10. A method according to claim 1 wherein the rubber is removed from a portion of the tire of a buffing or grinding process.

11. A method according to claim 1 wherein a plurality of tires are linked together before placing into the water.

12. A method according to claim 1 wherein a plurality of tires are provided together so that, in situation in the water they form a barrier or reef or structure therein.

13. A method according to claim 1 wherein the water is a river, lake, sea or ocean.

14. A method according to claim 1 wherein the metal is steel.

15. A method according to claim 1 wherein the tire in the water includes elements selected from Carbon, Steel, Sulphur, Selenium, Telurium, Amyl Alcohol, Zinc Oxide, Ester, Ether, Ethylene, Urea Formaldehyde, Oil, latex carotenes and/or terpenoids and the introduction of the tire into the water allows said elements to support life in the water.

* * * * *